UNITED STATES PATENT OFFICE.

RUDOLF SCHWABE, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

DERIVATIVES OF PHENYLCINCHONINIC ACID.

1,069,296.  Specification of Letters Patent.  Patented Aug. 5, 1913.

No Drawing.  Application filed July 31, 1912.  Serial No. 712,578.

*To all whom it may concern:*

Be it known that I, RUDOLF SCHWABE, Ph. D., chemist, a citizen of the Empire of Germany, residing at Höchst-on-the-Main, Germany, have invented certain new and useful Improvements in Derivatives of Phenylcinchoninic Acid, of which the following is a specification.

I have found that derivatives of the α-phenylcinchoninic acid of great therapeutical value are obtained by transforming α-arylcinchoninic acid into the corresponding acid amids; by "aryl" being understood an aromatic residue which may contain alkyloxy groups.

The process consists in treating with ammonia or an aliphatic amin the chlorids of the said acids, obtainable by heating α-arylcinchoninic acids or an alkyloxy derivative thereof with thionyl chlorid.

The new products have a radical of the formula:

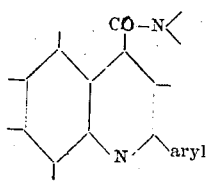

wherein "aryl" means an aromatic residue, which may contain alkyloxy groups. They may contain an amino group, or the hydrogen atoms of such group may be replaced by an alkyl. They are white compounds, insoluble in alkalis, soluble in diluted mineral acids, insoluble in water, soluble in hot alcohol; they are tasteless, whereby they are distinguished from the corresponding acids, and are consequently more valuable and suitable for therapeutical use than the acids.

The following examples illustrate my invention, the parts being by weight:

Example I: 10 parts of α-phenylcinchoninic acid chlorid are digested at ordinary temperature with 10 parts of diethyl-amin in an aqueous solution of 10% strength until the yellow coloration of the acid chlorid has disappeared. The new compound is then separated by filtration and recrystallized from diluted alcohol; it melts at 95° C., is tasteless, insoluble in water, readily soluble in hot alcohol, insoluble in alkalis, but dissolves in diluted mineral acids with formation of salts.

Example II: 10 parts of α-(m-ethoxy-phenyl)-cinchoninic acid chlorid are introduced into 50 parts of concentrated aqueous ammonia (25% strength) and the mixture is stirred until the yellow coloration of the acid chlorid has disappeared. The amid thus obtained is separated by filtration and recrystallized from alcohol; it has the formula:

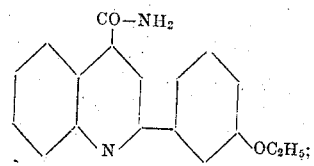

it forms white needles melting at 216° C.; it is tasteless, insoluble in water, soluble in hot alcohol, insoluble in ether; it dissolves in diluted hydrochloric acid and can be reprecipitated by the addition of caustic soda lye.

Having now described my invention what I claim is:

1. As new products, the amids of arylcinchoninic acids containing the radical of the formula:

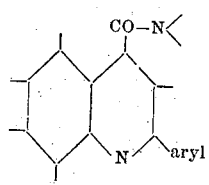

wherein "aryl" means an aromatic residue, being white, tasteless compounds, insoluble in alkalis, soluble in diluted mineral acids, insoluble in water, soluble in hot alcohol.

2. As new products, the amids of α-alkyloxyaryl-cinchoninic acids containing the radical of the formula

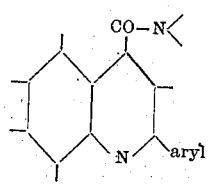

wherein "aryl" means an aromatic alkyloxylated residue, being white tasteless compounds insoluble in alkalis, soluble in diluted mineral acids, insoluble in water, soluble in hot alcohol.

3. As a new product, the ethoxyarylcinchoninic acid amid of the formula:

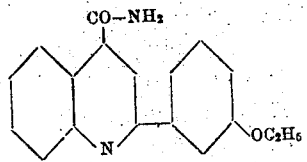

crystallizing in white needles, melting at 216° C., insoluble in alkalis, soluble in diluted mineral acids, insoluble in water, soluble in hot alcohol.

In testimony whereof, I affix my signature in presence of two witnesses.

RUDOLF SCHWABE.

Witnesses:
  JEAN GRUND,
  CARL GRUND.